(12) United States Patent
Kroner et al.

(10) Patent No.: US 6,849,703 B2
(45) Date of Patent: Feb. 1, 2005

(54) WATER-SOLUBLE POLYMERS OF ESTERS MADE FROM ACRYLIC ACID AND ALKYLPOLYALKYLENE GLYCOLS

(75) Inventors: Matthias Kroner, Eisenberg (DE); Karl-Heinz Büchner, Altlussheim (DE); Gregor Brodt, Heppenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/136,534

(22) Filed: May 2, 2002

(65) Prior Publication Data

US 2002/0188093 A1 Dec. 12, 2002

(30) Foreign Application Priority Data

May 22, 2001 (DE) .......................................... 101 25 237

(51) Int. Cl.$^7$ ............................................. C08F 220/46
(52) U.S. Cl. .................... 526/317.1; 526/322; 526/291; 526/318.3; 526/319; 526/323.1; 526/330; 524/558; 524/832; 560/198; 560/199; 560/205; 560/212; 560/218
(58) Field of Search ................................ 560/198, 199, 560/205, 212, 189, 224; 526/317.1, 322, 291, 319, 323.1, 330, 932, 320, 318.41; 524/558, 832, 5; 525/104, 451

(56) References Cited

U.S. PATENT DOCUMENTS 4,429,097 A * 1/1984 Chang et al. ................ 524/558
6,166,112 A * 12/2000 Hirata et al. .................... 524/5
6,214,958 B1   4/2001 Le-Khac et al.
6,265,495 B1 * 7/2001 Hirata et al. ................. 525/404

FOREIGN PATENT DOCUMENTS

| DE | 19957177 | 8/2001 |
|---|---|---|
| EP | 0 884 290 | 12/1998 |
| EP | 0989108 | 3/2000 |
| WO | WO 01/40337 | 6/2001 |
| WO | WO 01/94518 | 12/2001 |

* cited by examiner

Primary Examiner—Tatyana Zalukeva
(74) Attorney, Agent, or Firm—Oblon, Spivak, McClelland, Maier & Neustadt, P.C.

(57) ABSTRACT

Water-soluble polymers of esters made from acrylic acid and alkylpolyalkylene glycols, obtainable by azeotropic esterification of a mixture of acrylic acid and alkylpolyalkylene glycol in a molar ratio of from 2 to 3:1 in the presence of at least 85% by weight, based on the alkylpolyalkylene glycol, of an organic solvent which forms an azeotrope with water, followed by free-radical polymerization, in an aqueous medium, of the mixture obtained during the esterification, where the organic solvent is distilled off azeotropically from the reaction mixture during the polymerization, and the water removed by distillation is returned to the mixture or replaced by a feed of fresh water, and preparation and use of these polymers as an additive to cementitious systems.

27 Claims, No Drawings

WATER-SOLUBLE POLYMERS OF ESTERS MADE FROM ACRYLIC ACID AND ALKYLPOLYALKYLENE GLYCOLS

The present invention relates to water-soluble polymers of esters made from acrylic acid and alkylpolyalkylene glycols, obtainable by azeotropic esterification of a mixture of acrylic acid and alkylpolyalkylene glycol in a molar ratio of from 2 to 3:1 in the presence of at least 85% by weight, based on the alkylpolyalkylene glycol, of an organic solvent which forms an azeotrope with water, followed by free-radical polymerization, in an aqueous medium, of the mixture obtained during the esterification, where the organic solvent is distilled off azeotropically from the reaction mixture during the polymerization, and the water removed by distillation is returned to the mixture or replaced by a feed of fresh water.

The invention further relates to the preparation of the polymers, and also to their use as an additive to cementitious systems, in particular as a plasticizer and grinding aid.

Due to their particularly good dispersing action for cement in aqueous suspensions, water-soluble polymers based on polycarboxylic acid-alkylpolyalkylene glycol esters are of increasing technical interest to the construction industry, which uses them as concrete plasticizers, and they are replacing conventional concrete plasticizers based on melamine- or naphthalene-formaldehydesulfonates, since they have significantly higher dispersing power.

A continuing disadvantage with the polycarboxylic acid-alkylpolyethylene glycol esters known hitherto is that they lose activity during the course of use as concrete plasticizers, and the flowability of concrete deteriorates. This is particularly problematic in the case of ready-mix concrete, the flowability of which is established at the mixing plant. The concrete should retain the same flow properties when it is used at the building site. A wide variety of plasticizers continues therefore nowadays to be added at the building site, and this can lead to variations in concrete quality.

EP-A-989 108 discloses dispersing agents for concrete based on polymeric esters of acrylic acid and methylpolyethylene glycol, these being prepared by azeotropic esterification of acrylic acid and methylpolyethylene glycol ($M_w$ 472) in a molar ratio of 3.35:1 in cyclohexane, followed by replacement of the cyclohexane with added water, by means of azeotropic distillation, and polymerization of the resultant 80% strength by weight aqueous ester solution in water. This is a three-stage preparation process, and its distillation step gives problems with contamination of the apparatus by acrylic acid present in the distillate, necessitating the feed of a polymerization inhibitor into the condenser. In addition, the performance of the compounds obtained in this way is unsatisfactory.

The earlier German patent application 199 57 177.5 describes dispersing agents based on polymeric esters of methacrylic acid and methylpolyethylene glycol.

It is an object of the present invention to provide concrete plasticizers which have advantageous performance, in particular over the entire chain of processing and use of ready-mixed concrete, i.e. have constant plasticizing action during production, transport, and usage, and which can be prepared in a cost-effective manner.

We have found that this object is achieved by means of the water-soluble polymers, defined at the outset, of esters made from acrylic acid and alkylpolyalkylene glycols.

The invention also provides the process thus defined for preparing the polymers.

Finally, the invention provides the use of the polymers as an additive to cementitious systems.

To prepare the polymers of the invention, a mixture of acrylic acid and alkylpolyalkylene glycol in a molar ratio of from 2 to 3:1, preferably from 2.2 to 3:1, and particularly preferably from 2.5 to 3:1, is used and is subjected to azeotropic esterification, preferably with acidic catalysis. The excess acrylic acid which does not react with the alkylpolyalkylene glycol remains in the mixture obtained during the esterification and reacts as a comonomer during the free-radical polymerization which follows.

It can sometimes be advantageous if, in addition to acrylic acid up to 0.5 mol of another monoethylenically unsaturated carboxylic acid derivative is used for the esterification, for example maleic acid, maleic anhydride, or fumaric acid. However, it is preferable to undertake the esterification in the absence of these acids.

The azeotropic esterification of acrylic acid with the alkylpolyalkylene glycol takes place in the presence of an organic solvent which forms an azeotrope with water, and may be undertaken using processes known per se. This organic solvent is also termed an entrainer. During the azeotropic esterification the water produced during the reaction is removed azeotropically from the reaction mixture.

The esterification is continued at least until the conversion achieved is 85% by weight, preferably at least 90% by weight, based on the alkylpolyalkylene glycol. The conversion here may be followed using the fall-off in the acid value (acrylic acid) or the OH value (alkylpolyalkylene glycol) of the reaction mixture. It is also possible to determine the unesterified proportion of alkylpolyalkylene glycol alongside the polymer after the polymerization, with the aid of gel permeation chromatography studies (GPC).

Suitable esterifying alkylpolyalkylene glycols according to the invention are in particular compounds of the formulae

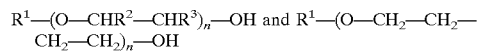

where:

$R^1$ is $C_1$–$C_{50}$-alkyl, preferably $C_1$–$C_4$-alkyl, or $C_1$–$C_{18}$-alkylphenyl;
$R^2$, $R^3$, independently of one another, are hydrogen, methyl, or ethyl;
n is from 5 to 90.

The molecular weight $M_w$ of the alkylpolyalkylene glycols is from 350 to 4000, preferably from 500 to 2000, particularly preferably from 750 to 1500, and very particularly preferably about 1000.

It is particularly preferable to use alkylpolyethylene glycols, very particularly preferably methylpolyethylene glycols, of the molecular weights mentioned.

Other suitable alkylpolyalkylene glycols are alkyl- (in particular methyl-) polyalkylene glycols which contain units of propylene oxide and/or butylene oxide combined with units of ethylene oxide. The arrangement of these units here may be in blocks or random.

Examples of these materials are methylpolyalkylene glycols obtainable by addition reactions of ethylene oxide and propylene oxide onto monohydric aliphatic alcohols, in particular by reactions which add 5 mol of ethylene oxide and 1 mol of propylene oxide,
5 mol of ethylene oxide and 3 mol of propylene oxide,
5 mol of ethylene oxide and 10 mol of propylene oxide,
10 mol of ethylene oxide and 1 mol of propylene oxide,
10 mol of ethylene oxide and 3 mol of propylene oxide,
10 mol of ethylene oxide and 10 mol of propylene oxide, 20 mol of ethylene oxide and 1 mol of propylene oxide,
20 mol of ethylene oxide and 3 mol of propylene oxide,
20 mol of ethylene oxide and 10 mol of propylene oxide,
25 mol of ethylene oxide and 1 mol of propylene oxide,
25 mol of ethylene oxide and 3 mol of propylene oxide, or
25 mol of ethylene oxide and 10 mol of propylene oxide onto 1 mol of methanol, ethanol, n-propanol, isopropanol or butanol.

It is also possible to use partially etherified polytetrahydrofuran which bears an alkyl group, preferably $C_1$–$C_4$-alkyl, as monolateral end group.

The activity of the copolymers in a given cementitious system may be further increased by using mixtures made from alkylpolyalkylene glycols with different molecular weights.

Examples of suitable mixtures have the following compositions:

30% by weight of methylpolyethylene glycol ($M_w$ 350) and 70% by weight of methylpolyethylene glycol ($M_w$ 1000),
50% by weight of methylpolyethylene glycol ($M_w$ 350) and 50% by weight of methylpolyethylene glycol ($M_w$ 2000),
70% by weight of methylpolyethylene glycol ($M_w$ 350) and 30% by weight of methylpolyethylene glycol ($M_w$ 4000),
30% by weight of methylpolyethylene glycol ($M_w$ 500) and 70% by weight of methylpolyethylene glycol ($M_w$ 1000),
30% by weight of methylpolyethylene glycol ($M_w$ 500) and 70% by weight of methylpolyethylene glycol ($M_w$ 2000),
30% by weight of methylpolyethylene glycol ($M_w$ 750) and 70% by weight of methylpolyethylene glycol ($M_w$ 1000),
30% by weight of methylpolyethylene glycol ($M_w$ 750) and 70% by weight of methylpolyethylene glycol ($M_w$ 2000),
50% by weight of methylpolyethylene glycol ($M_w$ 1000) and 50% by weight of methylpolyethylene glycol ($M_w$ 2000),
90% by weight of methylpolyethylene glycol ($M_w$ 1000) and 10% by weight of methylpolyethylene glycol ($M_w$ 4 000),
90% by weight of methylpolyethylene glycol ($M_w$ 1000) and 10% by weight of methylpolypropylene glycol ($M_w$ 1350),
90% by weight of methylpolyethylene glycol ($M_w$ 1000) and 10% by weight of methylpolypropylene glycol ($M_w$ 2000) and
90% by weight of methylpolyethylene glycol ($M_w$ 1000) and 10% by weight of methylpolyethylene glycol/methylpropylene glycol copolymer in a molar ratio of 90:10 ($M_w$ 1000).

It is advantageous to undertake the esterification in the presence of a catalyst. Catalysts which may be used here are any of the organic or inorganic acids. Examples of suitable acidic catalysts are sulfuric acid, sulfurous acid, di- and polysulfuric acid, sulfur trioxide, methanesulfonic acid, benzenesulfonic acid, p-toluenesulfonic acid, $C_2$–$C_{30}$-alkylbenzenesulfonic acids, sulfuric monoesters of $C_1$–$C_{30}$ alcohols or of alkylpolyalkylene glycols, phosphoric acid, phosphorous acid, hypophosphorous acid, polyphosphoric acid, hydrochloric acid, perchloric acid and acidic ion exchangers. Preference is given to p-toluenesulfonic acid and methanesulfonic acid, and p-toluenesulfonic acid is particularly preferred.

The amount of catalyst, based on the entirety of acrylic acid and alkylpolyalkylene glycol is generally up to 10% by weight, preferably from 0.05 to 7% by weight, and particularly preferably from 0.1 to 5% by weight.

Organic solvents suitable as entrainers during the esterification are aliphatic (isoaliphatic or linear aliphatic), cycloaliphatic, aliphatic-aromatic, or purely aromatic hydrocarbons. The boiling point of particularly suitable organic solvents is generally from 60 to 300° C., preferably from 70 to 150° C.

Particular examples of suitable organic solvents are:

n-paraffins, such as hexane, decane, undecane, dodecane, and octadecane;
isoparaffins, such as isooctane, isodecane, isododecane, isohexadecane, and isooctadecane;
cycloparaffins, such as cyclohexane, methylcyclohexane, and dimethylcyclohexane;
aromatics, such as benzene, toluene, o-, m- and p-xylene, xylene mixtures, trimethylbenzene, tetramethylbenzene, mesitylene, ethylbenzene, isopropylbenzene, n-butylbenzene, and isobutylbenzene.

Preference is given here to cyclohexane, methylcyclohexane, toluene, xylene mixtures, and o-xylene, and particular preference is given to toluene.

It is also possible to use industrially available mixtures which have a boiling range and are composed of various organic solvents. Mixtures of this type are also termed SPB gasolines, petroleum spirits, SPB spirits, naphtha, or petroleum ether fractions. They are often produced as refinery fractions and may be prepared specifically from steam-cracker olefins by oligomerization and hydrogenation. Examples of these SPB spirits are spirits with boiling ranges from 90 to 100° C., 100 to 140° C., and 140 to 160° C. Depending on the source, the fractions may comprise purely linear aliphatic, purely isoaliphatic, purely aliphatic-aromatic, or purely aromatic constituents.

Overviews of industrially available hydrocarbon mixtures may be found in: Kirk-Othmer, Encyclopedia of Chemical Technology, 1995, Vol. 13, pp. 744 et seq., Hydrocarbons chapter, and Vol. 12, pp. 126 et seq., Fuels chapter, and also pp. 341 et seq., Gasoline chapter; Ullmann's Encyclopedia of Industrial Chemistry, 1989, Vol. A13, pp. 227–281, Hydrocarbons chapter, and Vol. A16, pp. 719–755, Motor Fuels chapter.

Together with water the entrainer forms an azeotropic mixture whose boiling point is generally below that of the lower-boiling constituent. The boiling points of the azeotropic mixtures are preferably in the range from 70 to 130° C.

The proportion of entrainer in the reaction mixture is usually from 5 to 50% by weight, preferably from 10 to 40% by weight, based on the entirety of acrylic acid and alkylpolyalkylene glycol. The amount of entrainer here is advantageously such that the entrainer in the reaction mixture has a boiling point of from 100 to 150° C., preferably from 110 to 140° C. The boiling points of the azeotropes and of the entrainers in the mixture present during the esterification are generally higher than those of the pure substances.

Reducing agents may be added if desired in order to protect the monolaterally end-capped alkylpolyalkylene glycol from oxidative degradation during the esterification. Examples of suitable reducing agents are phosphorus compounds, such as hypophosphorous acid and phosphorous acid, and sulfur compounds, such as sulfur dioxide, thiosulfate, and dithionite. Mixtures of reducing agents may, of course, also be used.

If reducing agents are used, the amount is generally up to 5% by weight, preferably up to 2% by weight, based on alkylpolyalkylene glycol.

In order to prevent premature polymerization of acrylic acid and acrylic esters, it is advantageous for conventional polymerization inhibitors, such as phenothiazine, hydroquinone monomethyl ethers, or di-tert-butyl-p-cresol, to be added to the mixture used in the esterification.

The amount of inhibitor is generally from 0.001 to 2% by weight, preferably from 0.005 to 0.5% by weight, based on acrylic acid.

The esterification is usually carried out at from 80 to 200° C, preferably at from 90 to 170° C., and particularly preferably at from 110 to 140° C.

The esterification is advantageously undertaken under inert conditions. During the esterification it is advantageous for a stream of nitrogen to be passed through the reaction mixture, and this promotes the removal of the azeotrope by distillation. The amount of nitrogen passed through the reaction mixture per hour is preferably from 0.1 to 5 times, in particular from 0.5 to 2 times, the volume of the reactor contents.

An advantageous technique for the process is to condense the azeotrope in a heat exchanger and to separate the same in a phase separator, to give an upper organic phase and a lower aqueous phase. The organic phase is returned to the esterification reactor via appropriate piping. Suitable esterification reactors here are any of the distillation apparatuses usually used, e.g. stirred tank reactors, pot stills with or without recirculation, thin-film evaporators, falling-film evaporators, and tube-bundle evaporators.

The progress of the esterification may be followed by using samples and titrimetric determination of the amount of water formed, the acid value, and/or the OH value of the reaction mixture.

The esterification is continued until there is no further increase in the amount of water or no further decrease in the acid value or OH value. The time needed for this depends on the degree of alkoxylation of the alkylpolyalkylene glycol. The higher the degree of alkoxylation, the longer the esterification takes.

The organic solvent may remain in the esterification mixture once the esterification has been completed. The mixtures usually comprise from 10 to 40% by weight, preferably from 15 to 30% by weight, of organic solvent.

The materials usually present in the resultant esterification mixtures, besides catalyst and inhibitors, are the following monomers, which can be reacted during the subsequent free-radical polymerization: acrylic acid, alkylpolyalkylene glycol acrylate, and also polyalkylene glycol diacrylate, in amounts of less than 5% by weight, preferably less than 3% by weight, and unesterified alkylpolyalkylene glycol in amounts of less than 10% by weight.

The resultant liquid esterification mixtures can be stored without becoming hydrolyzed at from 10 to 100° C., in particular from 30 to 60° C., for at least 8 weeks. They have good flowability and pumpability and their viscosities at 40° C. are <100 mPas. They can be used for the subsequent polymerization without any prior purification.

The free-radical polymerization of the esterification mixture takes place in an aqueous medium, with simultaneous removal of the organic solvent from the polymerization reactor by azeotropic distillation.

Unlike the polymerization processes described in EP-A-989 108, the process of the invention always has small amounts of organic solvent present throughout the polymerization, and this has a favorable effect on the solubility and the polymerization behavior of the monomers. The amounts of organic solvent are approximately constant, since the organic solvent is constantly introduced into the polymerization reactor by the esterification product and at the same time is constantly removed from the reactor by azeotropic distilllation. Equilibrium concentration of organic solvent, from about 0.01 to 5% by weight, based on the aqueous polymer solution, is therefore formed during the polymerization.

The polymerization initiators used may be any of the known water-soluble peroxo or azo initiators. Particularly preferred polymerization initiators are hydrogen peroxide and the peroxodisulfates of sodium, of potassium, and of ammonium. The amounts of initiator are usually from 0.1 to 10% by weight, preferably from 0.5 to 5% by weight, based on the monomers to be polymerized.

The molecular weight of the polymers may advantageously be adjusted as desired with the aid of polymerization regulators, but the presence of polymerization regulators is not essential. Polymerization regulators used are preferably water-soluble compounds of sulfur, of nitrogen, or of phosphorus. Examples of particularly suitable initiators are sodium hydrogensulfite, sodium disulfite, sodium sulfite, sodium thiosulfate, sodium hypophosphite, phosphorous acid, mercaptopropionic acid, mercaptoacetic acid, mercaptoethanol, and alkali metal salts of the acids mentioned. It is, of course, also possible to use mixtures of the polymerization regulators mentioned. If a polymerization regulator is used, the amounts used are generally from 0.1 to 10% by weight, preferably from 1 to 5% by weight, based on the monomers to be polymerized.

The polymerization may be carried out continuously or batchwise. For a batch procedure it is advantageous to use water as polymerization medium in a vessel equipped with mixing apparatus, reflux condenser, and water separator, and to heat the medium to the polymerization temperature, and, once the polymerization has begun, then to add the esterification mixture, initiator and, where appropriate, regulator either continuously or batchwise.

The polymerization may be carried out at atmospheric pressure, at superatmospheric pressure, or else at subatmospheric pressure.

The reaction mixture is always boiling during the polymerization.

The water constantly removed in the distillate when the organic solvent is removed by azeotropic distillation is returned or replaced by a feed of fresh water. This ensures that the amount of water in the reaction mixture during the polymerization remains practically constant and that polymer solutions are formed whose strength is generally from 20 to 70% by weight, preferably from 30 to 50% by weight. The organic solvent present in the esterification mixture becomes distributed across a relatively large area in the polymerization reactor and is therefore rapidly removed from the system, the result being the establishment of the abovementioned equilibrium concentration.

The azeotrope is condensed as in the esterification reaction and separated into two phases. The organic phase may advantageously be reused in the esterification. If purification is needed, one method for this is liquid/liquid extraction with water. The organic solvent may also be purified by distillation or steam distillation.

In the batch operation described above, the monomers, the initiator, and, where appropriate, the regulator may be fed to the reactor in from 1 to 20 h, in particular in from 2 to 10 h. Once the metering of the materials has ended, the polymerization of the reaction mixture is usually continued for from 0.1 to 10 h, preferably from 0.5 to 3 h. It is preferable for the reaction mixture to be boiling during the continued polymerization. Any residues of organic solvent present may be distilled out from the polymerization mixture at this time.

The proportion of organic solvent in the aqueous polymer solution after the polymerization is preferably <100 ppm.

The process of the invention even permits complete removal of the organic solvent from the mixture obtained during the polymerization, the resultant residual contents of organic solvent being from 0 to 50 ppm, mostly from 1 to 30 ppm.

It can be advantageous to pass nitrogen or steam through the polymerization reactor in order to accelerate the removal of the organic solvent by azeotropic distillation and thus increase the space-time yield in the polymerization.

A base may be added before, during, or preferably after the polymerization in order to neutralize the polymer, which comprises acrylic acid comonomers. Any compounds which react as bases may be used for this purpose. Examples of those suitable are alkali metal oxides, alkali metal hydroxides, alkali metal carbonates, and alkali metal hydrogencarbonates, preference being given here to the potassium compounds and especially the sodium compounds, and alkaline earth metal oxides, and alkaline earth metal hydroxides, in particular the compounds of magnesium, of calcium, and of barium, and aluminum hydroxide, iron hydroxide, iron oxide, ammonia, and amines, such as cyclohexylamine, dicyclohexylamine, butylamine, ethanolamine, diethanolamine, triethanolamine, and morpholine. It is preferable to use sodium hydroxide for neutralization, in particular in the form of aqueous solutions of from 10 to 50% strength by weight.

The molecular weight $M_w$ of the polymers of the invention is generally from 1000 to 100 000, preferably from 5000 to 50 000.

The polymers of the invention have excellent suitability as an additive for cementitious systems, in particular for mortars or concrete. The amount used of the polymers of the invention here is usually from 0.1 to 5% by weight, based on the cementitious system.

The polymers of the invention have excellent efficacy as concrete plasticizers. They exhibit consistent plasticizing action over the chain of processing and use of concrete, and may therefore be used advantageously in ready-mixed concrete. They have a wide field of application, for various cementitious systems irrespective of their source, of their method of preparation, of their composition, and of their aggregates, such as sand, gravel, or fine aggregates, and at either low or high temperatures, i.e. in winter or in summer, and with a very wide variety of water qualities.

They may be admixed with the cementitious system in the form of powder, pellets, melts, or aqueous solution (mostly with strength of from 30 to 60% by weight), before, during or after the grinding process.

When admixed prior to the grinding of the fired cement klinker they have good properties as grinding aids during the grinding process and during the mechanical comminution of the cementitious system.

EXAMPLES

A) Preparation of Polymers of the Invention

The conversion during the esterification was determined by NMR spectroscopy. The K value of the polymers was determined by the method of H. Fikentscher, Cellulose-Chemie, Volume 13, pp. 58–64 and 71–74 (1932) in aqueous solution at pH 7 and 25° C., with a concentration of 1% by weight of the sodium salt of the polymer.

Ester 1

A mixture made from 500 g (0.5 mol) of methylpolyethylene glycol ($M_w$ 1000), 90 g (1.25 mol) of acrylic acid, 0.2 g of phenothiazine, 6 g of p-toluenesulfonic acid hydrate, and 260 g of toluene was heated for 9 h to 135° C. in a 2 l reactor with gas inlet pipe and water separator, with nitrogen flushing (formation of 9 g of water). The acid value of the esterification mixture, which was liquid at 20° C. and could be stored, was 50 mg KOH/g.

Ester 2

In a manner similar to the preparation of ester 1, a mixture made from 500 g (0.5 mol) of methylpolyethylene glycol ($M_w$ 1000), 99 g (1.375 mol) of acrylic acid, 0.2 g of phenothiazine, 6 g of p-toluenesulfonic acid hydrate, and 260 g of toluene was reacted.

The acid value of the esterification mixture, which was liquid at 20° C. and could be stored, was 58 mg KOH/g.

Ester 3

In a manner similar to the preparation of ester 1, a mixture made from 500 g (0.5 mol) of methylpolyethylene glycol ($M_w$ 1000), 108 g (1.5 mol) of acrylic acid, 0.2 g of phenothiazine, 6 g of p-toluenesulfonic acid hydrate, and 260 g of toluene was reacted for 7 h until formation of water ceased. The acid value of the esterification mixture, which was liquid at 20° C. and could be stored, was 66 mg KOH/g.

Example 1

450 g of water were heated to boiling, with nitrogen flushing, in a 2 l reactor with gas inlet pipe and water separator. Feeds 1 to 3 were then started simultaneously. Feed 1 was 400 g of ester 1. Feed 2 was 53 g of an 8% strength by weight aqueous sodium peroxodisulfate solution. Feed 3 was 27 g of a 10% strength by weight aqueous sodium hydrogensulfite solution. Feed 1 was metered in within a period of 6 h, and each of feeds 2 and 3 within a period of 6.25 h.

The toluene was constantly removed during the polymerization by distillation in the form of an azeotrope with water, and this was separated in the water separator to give an aqueous phase and a toluene phase. The aqueous phase was returned to the polymerization reactor, and the toluene was stored for reuse. Once the feeds had ended, further water and residual toluene were removed by distillation during a period of 1 h. The residual toluene content in the polymer solution was <20 ppm.

Cooling and neutralization with 30 g of 50% strength by weight sodium hydroxide solution to pH 7 gave a clear polymer solution of 35% strength by weight. The K value of the polymer was 25.

Example 2

The procedure was similar to that of Example 1, but the following feeds were used: feed 1 was 400 g of ester 2. Feed 2 was 53 g of an 8% strength by weight aqueous sodium peroxodisulfate solution. Feed 3 was 27 g of a 12% strength by weight aqueous sodium hydrogensulfite solution. This gave a 35% strength by weight polymer solution of pH 7. The K value of the polymer was 27.

Example 3

The procedure was similar to that of Example 1, but the following feeds were used: feed 1 was 350 g of ester 3. Feed 2 was 48 g of an 8% strength by weight aqueous sodium peroxodisulfate solution. Feed 3 was 27 g of a 40% strength by weight aqueous sodium hydrogensulfite solution. 43 g of 50% strength by weight aqueous sodium hydroxide solution were used for neutralization. This gave a 35% strength by weight polymer solution of pH 6.9. The K value of the polymer was 22.

B) Use of Polymers of the Invention

The cement-dispersing action of the polymers from Examples 1 to 3 were studied using the DIN 1164 or EN 196 mortar test.

The amounts used were:

500 g of Heidelberger CEM I 32.5 R cement
1350 g of CEN standard sand
225 g of drinking water
0.15% by weight of polymer, calculated in terms of solids content based on the amount of cement used, i.e. 0.75 g of polymer
0.35% by weight, based on the polymer, of a commercially available antifoam based on phosphoric esters.

In the table below the plasticizing action of the polymers on the mortar mixture is illustrated using the slump value after 1, 30 and 60 min.

| | Slump value in cm to DIN 1164 after | | |
|---|---|---|---|
| Polymer | 1 min | 30 min | 60 min |
| 1 | 17.3 | 17.0 | 15.7 |
| 2 | 17.7 | 18.7 | 16.4 |
| 3 | 18.2 | 18.4 | 16.1 |

We claim:

1. A process for preparing a water-soluble polymer comprising:
   (A) azeotropic esterification of acrylic acid and at least one alkylpolyalkylene glycol(s),
       wherein said acrylic acid and said at least one alkylpolyallcylene glycol are present in a molar ratio ranging from 2 to 3:1; and
       wherein said azeotropic esterification takes place in the presence of at least 85% by weight (based on the weight of the alkylpolyalkylene glycol) of an organic solvent which forms an azeotrope with water; thus obtaining an esterification mixture; and
   (B) free-radical polymerization in an aqueous medium of the mixture obtained during esterification, wherein the organic solvent is distilled off azeotropic ally from the polymerization reaction mixture, and the water that is removed by distillation is returned to the mixture or replaced by a feed of fresh water.

2. The process of claim 1, wherein said acrylic acid and said at least one alkylpolyallcylene glycol are present in a molar ratio ranging from 2.5 to 3:1.

3. The process of claim 1, wherein, in addition to the acrylic acid, up to 0.5 mol of another monoethylenically unsaturated carboxylic acid derivative is used for the esterification.

4. The process of claim 1, wherein the esterification takes place in the absence of other monoethylenically unsaturated carboxylic acid derivatives.

5. The process of claim 1, wherein the esterification continues until the conversion achieved is 85% by weight (based on the weight of the alkylpolyalkylene glycol).

6. The process of claim 1, wherein the esterification continues until the conversion achieved is at least 90% by weight (based on the weight of the alkylpolyalkylene glycol).

7. The process of claim 1, wherein said alkylpolyalkylene glycol has the following formula:

$$R^1-(O-CHR^2-CHR^3)_n-OH,$$

wherein
$R^1$ is $C_1-C_{50}$ alkyl or $C_1-C_{18}$ alkylphenyl,
$R^2$ and $R^3$ are, independently, hydrogen, methyl or ethyl, and
n is an integer from 5 to 90.

8. The process of claim 1, wherein said alkylpolyalkylene glycol has the following formula:

$$R^1-(O-CHR_2-CH_2-CH_2-CH_2)_n-OH,$$

wherein
$R^1$ is $C_1-C_{50}$ alkyl or $C_1-C_{18}$ alkylphenyl, and
n is an integer from 5 to 90.

9. The process of claim 1, wherein the weight average molecular weight of the alkylpolyalkylene glycol(s) ranges from 350 to 4,000.

10. The process of claim 1, wherein the weight average molecular weight of the alkylpolyalkylene glycol(s) ranges from 500 to 2,000.

11. The process of claim 1, wherein the weight average molecular weight of the alkylpolyalkylene glycol(s) ranges from 750 to 1,500.

12. A The process of claim 1, wherein said polyalkylene glycol(s) contain units of propylene oxide and/or butylene oxide combined with units of ethylene oxide, wherein the units may be arranged in blocks or at random.

13. The process of claim 1, wherein an acidic catalyst is used during esterification.

14. The process of claim 1, wherein a catalyst selected from the group consisting of p-toluenesulfonic acid and methanesulfonic acid is used during esterification.

15. The process of claim 1, wherein an aliphatic, cycloaliphatic aliphatic-aromatic or aromatic hydrocarbon solvent having a boiling point ranging from 70 to 150° C. is used during esterification.

16. The process of claim 1, wherein cyclohexane, methylcyclohexane, toluene, a xylene mixture, or o-xylene is used as a solvent during esterification.

17. The process of claim 1, wherein the boiling point of the azeotrope ranges from 70 to 130° C.

18. The process of claim 1, wherein a reducing agent is added during the esterification.

19. The process of claim 1, wherein hydrogen peroxide, or a peroxidisulfate of sodium, potassium or ammonium is used as polymerization initiator.

20. The process of claim 1, wherein a polymerization inhibitor is added to the mixture during esterification.

21. The process of claim 1, wherein a polymerization inhibitor is not added to the mixture during esterification.

22. The process of claim 1, wherein the esterification is undertaken under inert conditions.

23. The process of claim 1, wherein the organic solvent has an equilibrium concentration during polymerization at about 0.01 to 5% by weight (based on the weight of the aqueous polymer solution).

24. The process of claim 1, wherein the amount of water in the reaction mixture during the polymerization remains practically constant and a polymer solution forms which is about 20 to 70% by weight.

25. The process of claim 1, wherein the amount of water in the reaction mixture during the polymerization remains practically constant and a polymer solution forms which is about 30 to 50% by weight.

26. The process of claim 1, wherein a base is added, before, during or after the polymerization to neutralize the polymer.

27. The process of claim 1, wherein the weight average molecular weight of the polymer produced ranges from 5,000 to 50,000.

* * * * *

UNITED STATES PATENT AND TRADEMARK OFFICE
CERTIFICATE OF CORRECTION

PATENT NO. : 6,849,703 B2
DATED : February 1, 2005
INVENTOR(S) : Kroner et al.

It is certified that error appears in the above-identified patent and that said Letters Patent is hereby corrected as shown below:

<u>Title page,</u>
Items [45] and [*] Notice, should read
-- Date of Patent: **\*Feb. 1, 2005**
[*] Notice:   Subject to any disclaimer, the term of this patent is extended or adjusted under 35, U.S.C. 154(b) by 0 days.

This Patent is subject to a terminal disclaimer. --

Signed and Sealed this

Tenth Day of May, 2005

JON W. DUDAS
*Director of the United States Patent and Trademark Office*